United States Patent [19]

Hendricks et al.

[11] Patent Number: 5,569,724

[45] Date of Patent: Oct. 29, 1996

[54] N-MENTHYLOL DERIVATIVES OF POLYCONDENSATION PRODUCTS, THEIR PREPARATION AND USE

[75] Inventors: Udo-Winfried Hendricks, Odenthal; Ralf Heinen, Köln, both of Germany

[73] Assignee: Bayer Aktiengesellschaft, Leverkusen, Germany

[21] Appl. No.: 379,250

[22] Filed: Jan. 27, 1995

[30] Foreign Application Priority Data

Jan. 28, 1994 [DE] Germany .................. 44 02 532.7

[51] Int. Cl.$^6$ .................................................. C08L 77/08
[52] U.S. Cl. .................. 525/432; 428/315.5; 428/501; 428/502; 428/505; 525/440; 525/441; 525/443; 525/453; 525/456; 521/63; 521/64; 521/136; 521/155; 521/158; 528/329.1; 528/422
[58] Field of Search ................ 427/245, 375; 428/315.5, 501, 502, 505, 904, 904.4; 525/440, 441, 443, 403, 456; 521/63, 64, 136, 155, 158, 919; 528/329.1, 362, 422

[56] References Cited

U.S. PATENT DOCUMENTS 3,622,527  11/1971  Dieterich et al. .................. 521/136

OTHER PUBLICATIONS

K. Linder, "Tenside–Textihilfsmittel–Waschrohstoffe", vol. III, pp. 2618–2625, Wissenschaftliche, Verlagsgesellschaft MBH, Stuttgart (1971);.

C. Chwala et al., "Handbuch der Textilhilfsmittel", pp. 446–462, Verlag Chemie, New York (1977).

*Primary Examiner*—Shelley A. Dodson
*Attorney, Agent, or Firm*—Sprung Horn Kramer & Woods

[57] ABSTRACT

N-Methylol derivatives of polycondensation products containing quaternary N atoms obtained from
A) basic ureas of the formula $$HN(R^1)-C-N(R^2)-X^1-N(R^3, R^4) \quad (I),$$

B) polyamines of the formula $$(R^6, R^7)N-X^2-N(R^8, R^9) \quad (II)$$

and
C) bifunctional alkylating agents,
in which $X^1$, $X^2$ and $R^1$–$R^9$ have the meanings given in the description, are new. They are used as agents for improving the wet fastness properties of dyeings on cellulose and cellulose blend fabrics.

9 Claims, No Drawings

N-MENTHYLOL DERIVATIVES OF POLYCONDENSATION PRODUCTS, THEIR PREPARATION AND USE

BACKGROUND OF THE INVENTION

The present invention relates to N-methylol derivatives of polycondensation products obtained from basic ureas, polyamines and bifunctional alkylating agents, to a process for their preparation and to their use for improving the wet fastness properties of dyeings and prints obtained with reactive and direct dyestuffs on cellulose and cellulose blend fabrics.

SUMMARY OF THE INVENTION

New N-methylol derivatives of polycondensation products containing quaternary N atoms have been found, which derivatives are obtained from
A) basic ureas of the formula $$HN(R^1)—CO—N(R^2)—X^1—N(R^3, R^4) \qquad (I),$$

in which $X^1$ denotes $C_2$–$C_4$-alkylene, $R^1$ and $R^2$, independently of one another, represent hydrogen or $C_1$–$C_4$-alkyl or $R^1$ and $R^2$ together denote 1,2-ethylene or trimethylene and $R^3$ and $R^4$, independently of one another, represent hydrogen, $C_1$–$C_4$-alkyl or $C_2$–$C_4$-hydroxyalkyl, and $R^3$ can furthermore denote the radical —$X^1$—$N(R^2)$—CO—$NHR^1$ and $R^3$ and $R^4$ together can denote one of the radicals —$CH_2CH_2$—O—$CH_2CH_2$— or —$CH_2CH_2$—$N(R^5)$—$CH_2CH_2$— where $R^5$ denotes hydrogen, $C_1$–$C_4$-alkyl, $C_2$–$C_4$-hydroxyalkyl, the radical —$X^1$—$N(R^2)$—CO—$NHR^1$ or the radical —CO—$NH_2$, B) polyamines of the formula $$(R^6, R^7)N—X^2—N(R^8, R^9) \qquad (II),$$

in which $X^2$ denotes $C_2$–$C_6$-alkylene which may be interrupted by —O—, —$NR^{10}$— where $R^{10}$ represents hydrogen or $C_1$–$C_4$-alkyl or by —NH—CO—NH—, and $R^6$, $R^7$, $R^8$ and $R^9$, independently of one another, represent hydrogen, $C_1$–$C_4$-alkyl or $C_2$–$C_4$-aminoalkyl and $R^6$ and $R^7$ together and, independently thereof, $R^8$ and $R^9$ together or $R^6$ and $R^8$ together and, independently thereof, $R^7$ and $R^9$ together can denote 1,2-ethylene or trimethylene, and C) bifunctional alkylating agents.

DETAILED DESCRIPTION OF THE INVENTION

Preferred N-methylol derivatives of these polycondensation products are those in which the basic ureas used are those of the formula $$H_2N—CO—NH—X^1—N(R^{13}, R^{14}) \qquad (III)$$

in which $X^1$ denotes $C_2$–$C_4$-alkylene and $R^{13}$ and $R^{14}$, independently of one another, denote $C_1$–$C_3$-alkyl and $R^{13}$ furthermore can denote —$X^1$—NH—CO—$NH_2$.

Further preferred N-methylol derivatives of these polycondensation products are those in which the polyamines used are those of the formula $$(R^{16}, R^{17})N—X^2—N(R^{18}, R^{19}) \qquad (IV)$$

in which $X^2$ denotes $C_2$–$C_6$-alkylene which may be interrupted by —O—, —$NR^{10}$— where $R^{10}$ represents hydrogen or $C_1$–$C_4$-alkyl or by —NH—CO—NH—, and $R^{16}$, $R^{17}$, $R^{18}$ and $R^{19}$, independently of one another, denote hydrogen or $C_1$–$C_3$-alkyl.

The invention furthermore provides a process for preparing the above N-methylol derivatives of polycondensation products which is characterized in that A) basic ureas, B) polyamines and C) bifunctional alkylating agents are made to react in an A/B/C molar ratio of 0.5–2.5:1:1.0–3.2 at 40° to 130° C. in the presence of water or polar organic solvents and the reaction products are then reacted at 40° to 110° C. and pH values of 8 to 11 with formaldehyde or formaldehyde-releasing compounds, 0.5–1.2 mol of formaldehyde being used per urea group —$N(R^2)$—CO—$NH(R^1)$.

Finally, the invention relates to the use of the abovementioned N-methylol derivatives of polycondensation products for improving the wet fastness properties of dyeings and prints obtained with reactive and direct dyestuffs on cellulose and cellulose blend fabrics.

In the above formulae, $C_2$–$C_4$- and $C_2$–$C_6$-alkylene denote 1,2-ethylene, trimethylene, tetramethylene, pentamethylene or hexamethylene and also branched alkylene groups, such as 1,2-propylene or 1,3-dimethyl-tetramethylene. 1,2-Ethylene and trimethylene are preferred.

Examples of $C_1$–$C_4$-alkyl are methyl, ethyl, propyl, isopropyl, butyl, isobutyl. Methyl or ethyl is preferred.

Examples of $C_2$–$C_4$-hydroxyalkyl are 2-hydroxy-ethyl, 3-hydroxy-propyl, 2-hydroxy-propyl or 2-, 3- or 4-hydroxy-butyl. 2-Hydroxy-ethyl is preferred.

Examples of $C_2$–$C_4$-aminoalkyl are 2-amino-ethyl, 3-aminopropyl, 2-amino-propyl or 2-, 3- or 4-aminobutyl. 2-Amino-ethyl is preferred.

$C_2$–$C_6$-alkylene in formulae (II) and (IV) may be interrupted by oxygen or the group —$NR^{10}$— or by the group —NH—CO—NH—.

Radicals attached to N atoms together can complement a ring in the manner described above, so that basic ureas A or polyamines B are present which are cyclic or bicyclic systems.

Examples of basic ureas A are $CH_3—NH—(CH_2)_3—NHCONH_2$ $(CH_3)_2N—(CH_2)_3—NHCONH_2$

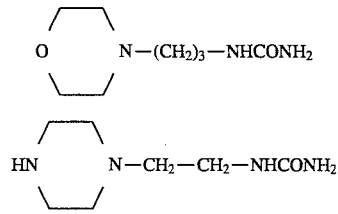

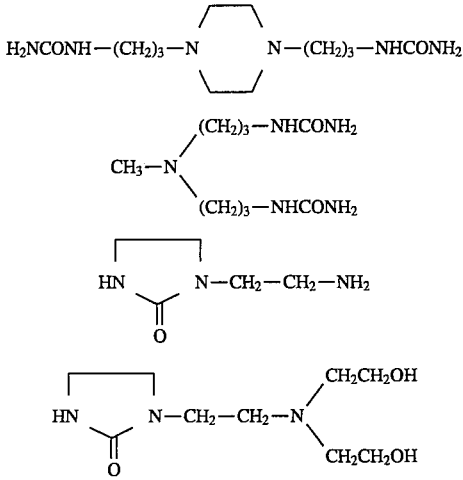

The basic ureas A are known or can be prepared by known methods, for example by thermal condensation of polyamines with urea with the elimination of ammonia or by reacting polyamines with alkali metal cyanates, as described, for example, in Houben-Weyl, Methoden der organischen Chemie Methods of Organic Chemistry), Volume E4 (1983), p. 362 ff.

Examples of polyamines B include ethylenediamine, 1,3-diaminopropane, 1,4 -diaminobutane, 1,6-diaminohexane, piperazine, N,N'-dimethylpiperazine, N,N'-bis-(2-hydroxyethyl)-piperazine, aminoethyl-piperazine, diethylenetriamine, triethylene-tetramine, 1-amino-3-dimethylaminopropane, 1,2-bis-(dimethylamino)-ethane, 1,3-bis-(dimethylamino)-propane, 1,4-diazabicyclo-(2,2,2)-octane and N,N'-bis-(3-dimethylaminopropyl)-urea.

Examples of bifunctional alkylating agents C belong to the group of dihalogenoalkanes, preferably of α,ω-dihalogenoalkanes, dihalogenoalkenes (preferably α,ω-), dihalogenoalkyl ethers, dihalogenoalkanols, epihalogenohydrins and bis-epoxy compounds, preferably of α,ω-dihalogenoalkanes, α,ω-dihalogenoalkenes and epihalogenohydrins.

Examples of these are 1,2-dichloroethane, 1,2-dichloropropane, 1,3-dichloropropane, 1-bromo-3-chloropropane, 1,4-dichlorobutane, 1,6-dichlorohexane, 1,4-dichloro-2-butene, bis-(2-chloroethyl)ether, 1,3-dichloro-2-propanol, epibromohydrin, epichlorohydrin, diglycidyl ether, ethane-1,2-bis-glycidyl ether and butane-1,4-bis-glycidyl ether.

Examples of formaldehyde-releasing compounds are paraformaldehyde and trioxane.

To prepare the above N-methylol derivatives of the polycondensation products, the basic ureas A are reacted with the polyamines B and the bifunctional alkylating agents C in an A/B/C molar ratio of 0.5–2.5:1:1.0–3.2, preferably of 1.5–2.3:1:2.0–3.0, at elevated temperature. Such a temperature is, for example, 40°–130° C. The reaction is carried out in the presence of water or polar organic solvents, such as lower alcohols or glycols. Basically, the amount of the reaction medium is not critical; it should ensure a readily stirrable solution or suspension and is in general 50–500 % by weight, preferably 50–200 % by weight, relative to the total weight of A, B and C. In this reaction, N atoms are alkylated and/or quaternized by the alkylating agent C in a manner known to one skilled in the art, as a result of which the polycondensation product contains cationic groups. The polycondensation products thus obtained are reacted in the form of a viscous melt or, preferably, as a solution in water or lower alcohols at pH values of 8–11 and at temperatures of 40°–110° C. with formaldehyde or formaldehyde-releasing compounds. In this reaction, 0.5 to 1.2 mol of formaldehyde, preferably 0.8–1.0 mol of formaldehyde, are used per urea group.

The N-methylol derivatives of the polycondensation products to be used according to the invention can be applied to the fibre material to be dyed in a pretreatment process or else can be applied to finished dyeings and prints in an aftertreatment process.

In the case of a pretreatment, the fibre material treated with the polycondensation products is then dyed from a short or long liquor in the manner customary for the particular dyestuffs. The pretreatment takes place by impregnation or printing with aqueous padding liquors or printing pastes containing, in addition to the polycondensation products in amounts of 20 to 150 g, preferably 40 to 100 g, per litre of padding liquor or printing paste, the acidic compounds necessary for the chemical reaction of the N-methylol groups of the polycondensation products with the hydroxyl groups of the fibre material.

Examples of suitable acidic compounds include inorganic and organic acids and latent acidic compounds which do not display their acidity until higher temperatures are reached, these acidic compounds being added to the aqueous liquors in amounts of 2 to 40 g, preferably 5 to 20 g, per litre. Suitable compounds are: hydrochloric acid, sulphuric acid, phosphoric acid, oxalic acid, citric acid, trichloroacetic acid, acidic salts of polyvalent metals, such as, for example, the nitrates, sulphates, chlorides or hydrogen phosphates of aluminium, magnesium and zinc, ammonium salts, such as, for example, ammonium nitrate, ammonium oxalate, monoammonium phosphate and diammonium phosphate or mixtures of these compounds. The aqueous liquors can also contain, in addition to the components mentioned, further customary auxiliaries, such as padding auxiliaries or wetting agents.

Impregnation of the fabrics with the aqueous liquors can take place by padding, face padding, spraying or other customary application methods. The fibre material thus impregnated is squeezed off to a liquor pickup of 60 to 100%, preferably 70 to 90%, of the fibre weight and is subjected to a heat treatment with or without drying in between; this can be effected by a short dry heat treatment, for example at 120° to 150° C. for 2 to 10 minutes. This heat treatment results in fixation of the compositions according to the invention on the fabric. During the aftertreatment, the cellulose or cellulose blend fabric fibre materials dyed with reactive or direct dyestuffs in the usual manner are impregnated with aqueous liquors containing the compositions according to the invention in amounts of 20 to 150 g, preferably 40 to 60 g, per litre in addition to the acidic compounds catalyzing the reaction of the N—methylol groups with the hydroxyl groups of the fibre material. If desired, auxiliaries customary in dyeing, such as padding auxiliaries, wetting agents and the like, can also be used. In this case, too, subsequent fixation is effected by heat treatment, preferably a short dry heat treatment.

The compositions according to the invention are used on textile material made of natural cellulose, such as cotton or linen, or regenerated cellulose, such as staple viscose, filament viscose or modal fibres; these fibre materials can be present either by themselves or in blends with synthetic fibre materials, for example those made of polyester, polyamide or polyacrylonitrile.

The compositions according to the invention can be used for the pre- or aftertreatment of dyeings and prints with those dyestuffs listed, for example, in the Colour Index, 3rd edition (1971), Vol. 2 on pages 2005 to 2478 as direct dyestuffs and in Vol. 1 on pages 1001 to 1562 as acid dyestuffs. Dyeings and prints which have been produced with reactive dyestuffs can also be aftertreated, in order to bind on the fibre the dyestuff hydrolysate produced by the undesirable reaction of the fibre-reactive dyestuff with water.

Such fibre-reactive dyestuffs containing groups which are capable of reacting with cotton and regenerated cellulose are known in large numbers. Examples of fibre-reactive groups include the following groups:

Halogenotriazine, halogenopyrimidine, halogenoquinoxaline-carbonyl, halogenophthalazine-carbonyl, vinylsulphonyl, β-hydroxyethylsulphonic ester, methylsulphonyltriazine, methylsulphonyl-pyrimidine, methyl-sulphonyl-benzothiazole, fluorobenzothiazole, β-hydroxyethylsulphonamido ester, aminoalkyl-sulphonylethyl ester, α-bromoacryloyl, β-chloropropionyl, β-chloroacetyl, β-phenylsulphonylpropionyl, halogenopyridazonealkyl, 2-chloro-benzothiazolesulphonyl, alkylsulphonylpyrimidine groups.

These dyestuffs are described, for example, by E. Siegel in "Chimia" (Supplement 1968) pages 100–114 and by K. Venkataraman in "The Chemistry of Synthetic Dyes" (1972) Vol. VI. Analogous dyestuffs are listed in Colour Index, 3rd edition (1971), Vol. 3 on pages 3391 to 3560.

The compositions according to the invention result in a surprisingly substantial improvement of the colour fastness properties, in particular of the water, perspiration and wash fastness properties, compared with the colour fastness properties of customary dyeings and prints obtained with anionic dyestuffs, in particular also at higher wash temperatures, for example at 60° C., and in some cases even at 95° C.

In the subsequent dyeing, fibre materials which have been pretreated with the polycondensation products according to the invention give a significantly higher colour yield, which translates into a substantial saving of the dyestuff to be used.

When producing dyeings and prints with anionic dyestuffs, it is customary to add electrolyte salts, such as, for example, sodium chloride or sodium sulphate, to the dyeing liquors, in order to achieve a satisfactory absorption of the dyestuffs on the textile material.

When dyeings and prints are produced with fibre-reactive dyestuffs, alkalis are used additionally in order to ensure fixation of the dyestuffs on the textile material.

The large amounts of these auxiliary chemicals obtained after the dyeing processes are complete constitute a substantial pollution of the environment. Fibre materials which have been pretreated with the polycondensation products according to the invention can be dyed using much smaller amounts of electrolyte salts or in many cases can even be dyed in the complete absence of electrolyte salts. When dyeing with fibre-reactive dyestuffs, the amount of alkali can be substantially reduced or the use of alkalis can be dispensed with entirely.

A further advantage of the compositions according to the invention is that the dyeings aftertreated therewith give, in terms of their colour fastness properties, significantly improved wash fastness properties even at elevated washing temperatures, for example at 60° C., in some cases even at 95° C. A further advantage of the compounds of the formula (I) is that they can be used in a single bath together with the N-methylol compounds usually used for the permanent finishing of cellulose. In this case, the padding liquors used for the aftertreatment of finished dyeings and prints contain, in addition to the compounds of the formula (I) in amounts of 20 to 150 g, preferably 40 g to 60 g, per litre of padding liquor, N-methylol compounds customarily used for the permanent finishing of cellulose in amounts of 40–150 g per litre of padding liquor, and the acidic compounds necessary for condensation. Subsequent fixation takes place by the methods of permanent finishing, in particular by a short dry heat treatment.

Customary N-methylol compounds which are used for the permanent finishing of cotton are etherified or unetherified acyclic and cyclic N-methylol compounds, such as, for example, N,N'-dimethylol-urea, N,N'-dimethylol-ethyleneurea or -propyleneurea, N,N'-dimethylol-dihydroxyethyleneurea, alkyl N,N'-dimethylol-carbamates or methylolated melamines. Suitable compounds are described, for example, in K. Lindner "Tenside-Textilhilfsmittel-Waschrohstoffe" (Surfactants/textile auxiliaries/detergent base materials) Vol. III (1971) p. 2618–2625 and M. Chwala/ V. Anger "Handbuch der Textilchemie" (Handbook of Textile Chemistry) (1977) p. 446–462.

In most cases, the previously used aftertreatment agents for improving the fastness properties result in hardening of the aftertreated fibre material which, inter alia, leads to a harder handle of the material and to poorer sewability. In contrast, the aftertreatment with the compounds according to the invention impairs handle and sewability of the aftertreated material to a far lesser extent.

EXAMPLE 1

343.5 parts of N,N-bis-(3-ureidopropyl)-methylamine were dissolved in 280 parts of water and mixed with 78 parts of N,N,N'N'-tetramethylpropylenediamine. 211 parts of 1-bromo-3-chloropropane were metered in at 50° to 60° C. over a period of one hour. The mixture was then stirred at 70° to 80° C. for 3 hours and at 80° to 90° C. for 5 hours. Titrimetric determination of bromide and chloride gave 11.7% of bromide and 5.1% of chloride.

The solution of the condensation product was diluted with 347.6 parts of water and brought to a pH of 9.0 to 9.5 with a small amount of 10% strength sodium hydroxide solution. 218.6 parts of a 37% strength aqueous formaldehyde solution were then metered in at 45° to 50° C. over a period of 1 hour, and the resulting mixture was stirred at 45° to 50° C. for another 4 hours. During stirring, the pH was maintained at 9.0 to 9.5 by occasional addition of 10% strength sodium hydroxide solution. The pH was brought to 8.7 to 9.0 with about 5 parts of glacial acetic acid, and the reaction mixture was diluted with 875.2 parts of water to a solids content of 30%. This gave 2403 parts of the aqueous solution of the condensation product.

EXAMPLE 2

115.5 g parts of N,N-bis-(3-ureidopropyl)-methylamine and 22.4 parts of 1,4-diazabicyclo[2.2.2] octane were dissolved in 92 parts of water. 75.1 parts of 1-bromo-3-chloropropane were metered in at 50° to 60° C. over a period of one hour. The resulting mixture was then stirred at 70° to 80° C. for 3 hours and at 80° to 90° C. for 5 hours. Titration for base nitrogen with perchloric acid in glacial acetic acid gave a residual base nitrogen content of 0.26%.

The mixture was diluted with 117 parts of water, brought to a pH of 9.0 to 9.5 with 10% strength sodium hydroxide solution, and 73 parts of a 37% strength aqueous formalin solution were metered in at 45° to 50° C. The resulting mixture was stirred at 45° to 50° C. for 4 hours, during which the pH was kept constant by addition of sodium hydroxide solution. After the pH had been brought to 8.7 to 9.0 with glacial acetic acid, the mixture was brought to a solids content of 30% by addition of 305 parts of water. This gave 813 parts of the aqueous solution of the condensation product.

EXAMPLE 3

Following the method of Example 2, 58 parts of N,N-bis-(3-ureidopropyl)methylamine, 13.4 parts of N,N,N',N'-tetramethylpropylenediamine and 34.8 parts of 1,6-dichlorohexane in 47 parts of water were subjected to polycondensation until the base nitrogen content had dropped to 0.5%. The reaction product was diluted with 100 parts of water and reacted with 45 parts of 30% aqueous formaldehyde solution to give 298 parts of the solution of the polycondensation product having a solids content of 40.8%.

EXAMPLE 4

Following the method of Example 2, 116 parts of bis-(3-ureidopropyl)-methylamine, 46 parts of N,N'-bis-(3-di-methyl-aminopropyl)-urea and 74.3 parts of 1-bromo-3-chloropropane in 92.5 parts of water were subjected to polycondensation until the base nitrogen content had dropped to 0.07%. The reaction product was then diluted with 142 parts of water and reacted with 73 parts of 37% strength aqueous formaldehyde solution to give 543 parts of an aqueous solution of the polycondensation product having a solids content of 45.5%.

EXAMPLE 5

Following the method of Example 2, 58 parts of N,N-bis-(3-ureidopropyl)-methylamine, 13.4 parts of N,N,N',N'-tetramethylpropylenediamine and 28.1 parts of 1,4-dichloro-2-butene in 70 parts of water were subjected to polycondensation until the base nitrogen content had dropped to 0.2%. The reaction product was then reacted with 32.4 parts of 37% strength aqueous formaldehyde solution to give 201 parts of an aqueous solution of the condensation product having a solids content of 54.4%.

EXAMPLE 6

29.0 parts of N-(3-dimethylaminopropyl)-urea and 10.2 parts of 3-dimethylaminopropylamine were dissolved in 39.2 parts of water and made to react with 27.8 parts of epichlorohydrin at 30° to 40° C. with cooling. The reaction mixture was stirred at 35° to 40° C. for 1 hour and at 55° to 60° C. for 2 hours until titrimetric determination of chloride gave a value of at least 10.0%. The aqueous solution of the condensation product was then diluted with 28 parts of water, brought to a pH of 9 to 9.5 with 1.2 parts of 25% strength aqueous hydrochloric acid, and 15.4 parts of 37% strength aqueous formaldehyde solution were added at 40° to 45° C. The reaction mixture was stirred at 40° to 45° C. for 3 hours and then brought to a pH of 8 to 8.5 with glacial acetic acid. This gave 152 parts of the aqueous solution of the polycondensation product having a solids content of 48%.

EXAMPLE 7

76 parts of N,N-dimethyl-1,3-diaminopropane, 27 parts of urea and 11.5 parts of water were stirred at 105° to 110° C. for 10 hours until evolution of ammonia had almost completely come to a stop. The colourless, viscous reaction mixture was dissolved in 83 parts of water and reacted with 72.2 parts of epichlorohydrin at 35° to 40° C. over a period of 45 minutes with cooling.

The reaction mixture was stirred at 35° to 40° C. for 1 hour, at 60° to 65° C. for 3 hours and at 70° to 75° C. for 4 hours until titrimetric determination of chloride gave a value of 10.5%. The reaction mixture was diluted with 73 parts of water, 35 parts of a 37% strength 0 aqueous formaldehyde solution were added at 40° to 45° C., and the mixture was stirred at the same temperature for 4 hours. After bringing the pH to 8 to 8.5 with glacial acetic acid, 369 parts of the aqueous solution of the condensation product having a solids content of 49% were obtained.

EXAMPLE 8

Following the method of Example 7, 76.6 parts of N,N-dimethyl-1,3-diaminopropane, 22.5 parts of urea, 97 parts of epichlorohydrin and 28.9 parts of 37% strength aqueous formaldehyde solution were reacted to give a polycondensation product whose aqueous solution had a solids content of 47%.

Use Example 1

A cotton fabric was treated in a winch machine at 40° C. and a liquor ratio of 20:1 with a dyeing liquor containing, per litre, a dyestuff mixture of 0.44 g of Direct yellow 58+0.35 g of Direct black 112+0.3 g of Direct red 83:1.

The dyeing bath was heated to 98° C. over a period of 30 minutes, and then 20 g/l of calcined sodium sulphate were added. After a dyeing time of one hour at the same temperature, the dyeing liquor was cooled to 80° C. at a rate of 1° C./minute and maintained at this temperature for 15 minutes. The dyeing was then rinsed with cold water and dried at 80° C. in a through-circulation drying cabinet.

This dyeing was then padded on a pad-mangle with a liquor containing, per litre, 32 g of the condensation product described in Example 6 and 10 g of $MgCl_2$, at room temperature and a liquor pickup of 100%.

The dyeing was then dried at 80° C. in a through-circulation drying cabinet and then fixed on a stenter frame at 180° C. for 1 minute.

The fastness test of the aftertreated fabric gave the following fastness rating compared with a non-after-treated dyeing.

|  | without aftertreatment | with aftertreatment |
| --- | --- | --- |
| Water fastness DIN 54 006 ISO 105 E01 | 1.3 | 4.7 |
| Bleeding on cotton ISO C2 wash DIN 54 017 ISO 105 C06 | 1.4 | 3.9 |

USE EXAMPLE 2

A cotton fabric was dyed in a winch machine with a dyeing liquor containing, per litre, a dyestuff mixture of 0.44 g of Direct blue 85+0.33 g of Direct red 89+0.15 g of Direct orange 46 and dried, as described in Example 1.

This dyeing was then dried on a pad-mangle as described in Use Example 1 with a liquor containing, per litre, 62.5 g of the condensation product described in Example 6 and 10 g of $MgCl_2$, and was fixed.

| Fastness test | without aftertreatment | with aftertreatment |
|---|---|---|
| Water fastness DIN 54 006 ISO 105 E01 | 1.1 | 4.7 |
| Bleeding on cotton ISO C2 wash DIN 54 017 ISO 105 C06 | 1.3 | 4.2 |

USE EXAMPLES 3–10

Cotton samples which were dyed and dried by the procedure of Example 1 were aftertreated by the method of Example 1 with the amounts mentioned in Table 1 of the condensation product (1) described in Example 6 and $MgCl_2$ (2), and were dried and fixed.

TABLE 1

| Ex. No. | Dyeing with | Amount of (1) g/l | Amount of (2) g/l | Wash fastness DIN 54 017 |
|---|---|---|---|---|
| 3 | 2.00% of Direct yellow 58 | 32 | 10 | 3.8 |
| | " | — | — | 1.2 |
| 4 | 1.95% of Direct red 212 | 62.5 | 10 | 4.2 |
| | " | — | — | 0.9 |
| 5 | 2.70% of Direct blue 229 | 62.5 | 10 | 2.8 |
| | " | — | — | 1.0 |
| 6 | 1.50% of Direct yellow 86 | 62.5 | 10 | 3.9 |
| | " | — | — | 1.1 |
| 7 | 1.80% of Direct blue 85 | 32 | 10 | 4.4 |
| | " | — | — | 1.3 |
| 8 | 1.20% of Direct red 89 | 32 | 10 | 3.8 |
| | " | — | — | 1.2 |
| 9 | 1.20% of Direct red 83:1 | 32 | 10 | 3.9 |
| | " | — | — | 1.3 |
| 10 | 3.50% of Direct violet 95 | 47 | 10 | 4.0 |
| | " | — | — | 1.1 |

USE EXAMPLE 11

A cotton fabric was treated at 40° C. in a winch machine with a dyeing liquor containing, per litre, 0.75 g of the dyestuff Direct violet 47 at a liquor ratio of 20:1. The dyeing bath was heated to 98° C. over a period of 30 minutes, and 20 g/l of calcined sodium sulphate were then added. After a dyeing time of one hour at the same temperature, the dyeing liquor was cooled to 80° C. at a rate of 1° C./minute and maintained at this temperature for 15 minutes. The dyeing was then rinsed with cold water and dried at 80° C. in a through-circulation drying cabinet.

This dyeing was then padded on a pad-mangle with a liquor containing, per litre, 50 g of the condensation product described in Example 1 and 10 g of $MgCl_2$ at room temperature and a liquor pickup of 100%.

The dyeing was then dried at 80° C. in a through-circulation drying cabinet and then fixed on a stenter frame at 180° C. for 1 minute.

| Fastness test | without aftertreatment | with aftertreatment |
|---|---|---|
| Wash fastness ISO C2 wash DIN 54 017 ISO 105-C06 | 0.9 | 4.9 |

USE EXAMPLES 12–19

Cotton dyeings which were dyed and dried by the procedure of Example 1 were aftertreated by the method of Example 1 with the amounts mentioned in Table 2 of the condensation product (1) described in Example 1 and $MgCl_2$ (2), and were dried and fixed.

TABLE 2

| Ex. No. | Dyeing with | Amount of (1) g/l | Amount of (2) g/l | Wash fastness DIN 54 017 |
|---|---|---|---|---|
| 12 | 2.00% of Direct yellow 58 | 50 | 10 | 3.5 |
| | " | — | — | 1.2 |
| 13 | 1.95% of Direct red 212 | 100 | 10 | 4.0 |
| | " | — | — | 0.9 |
| 14 | 2.70% of Direct blue 229 | 100 | 10 | 3.0 |
| | " | — | — | 1.0 |
| 15 | 1.50% Direct yellow 86 | 100 | 10 | 3.2 |
| | " | — | — | 1.1 |
| 16 | 1.80% of Direct blue 85 | 50 | 10 | 3.8 |
| | " | — | — | 1.3 |
| 17 | 1.20% of Direct red 89 | 50 | 10 | 4.5 |
| | " | — | — | 1.2 |
| 18 | 1.20% of Direct red 83:1 | 50 | 10 | 3.5 |
| | " | — | — | 1.3 |
| 19 | 3.50% of Direct violet 95 | 75 | 10 | 4.2 |
| | " | — | — | 1.1 |

USE EXAMPLE 20

A cotton fabric was treated at 40° C. in a winch machine with a dyeing liquor containing, per litre, 0.75 g of the dyestuff Direct violet 47 at a liquor ratio of 20:1. The dyeing bath was heated to 98° C. over a period of 30 minutes, and 20 g/l of calcined sodium sulphate were then added. After a dyeing time of one hour at the same temperature, the dyeing liquor was cooled to 80° C. at a rate of 1° C./minute and maintained at this temperature for 15 minutes. The dyeing was then rinsed with cold water and then dried at 80° C. in a through-circulation drying cabinet.

This dyeing was then padded on a pad-mangle with a liquor containing, per litre, 50 g of the condensation product described in Example 8 and 10 g of $MgCl_2$ at room temperature and a liquor pickup of 100%.

The dyeing was then dried at 80° C. in a through-circulation drying cabinet and then fixed on a stenter frame at 180° C. for 1 minute.

| Fastness test | without aftertreatment | with aftertreatment |
|---|---|---|
| Wash fastness ISO C2 wash DIN 54 017 ISO 105-C06 | 0.9 | 4.8 |

Furthermore, the light resistance was not adversely affected by the aftertreatment.

USE EXAMPLE 21

A cotton fabric was treated at 50° C. in a winch machine with a dyeing liquor containing, per litre, 2 g of Reactive red 123 and 0.5 g of NaHCOB at a liquor ratio of 20:1. After 10 minutes of treatment at this temperature, 50 g/l of calcined $Na_2SO_4$ were added. After another 30 minutes, 4 g/l of $Na_2CO_3$ and, after a further 30 minutes, 1.5 ml/l of sodium hydroxide solution 38° Bé were added. After a residence time of 60 minutes following the addition of sodium hydroxide solution at a constant temperature of 50° C., the dyeing was rinsed at a liquor ratio of 20:1 as follows:

1. 1×10 minutes at 50° C.,
2. 4×10 minutes at room temperature.

The material insufficiently rinsed after 1. and 2., which still contained substantial portions of non-fixed and/or hydrolysed reactive dyestuff, was squeezed off to a liquor pickup of 100% using a pad-mangle and dried at 80° C. in a through-circulation drying cabinet. This dyeing was then padded on a pad-mangle with a liquor containing, per litre, 19 g of the condensation product described in Example 2 and 10 g of $MgCl_2$ at room temperature and a liquor pickup of 100%. The dyeing was then dried at 80° C. in a through circulation drying cabinet and then fixed on a stenter frame at 180° C. for 1 minute.

| Fastness test | without aftertreatment | with aftertreatment |
|---|---|---|
| Wash fastness ISO C2 wash DIN 54 017 ISO 105-C06 | 1.4 | 3.9 |

USE EXAMPLE 22

A cotton fabric was treated at 40° C. in a winch machine with a dyeing liquor containing, per litre, a dyestuff mixture of 0.175 g of Direct yellow 58+0.08 g of Direct red 83:1+0.175 g of Direct black 112 at a liquor ratio of 20:1.

The dyeing bath was heated to 98° C. over a period of 30 minutes, and 20 g/l of calcined sodium sulphate were then added. After a dyeing time of one hour at the same temperature, the dyeing liquor was cooled to 80° C. at the rate of 1° C./minute and maintained at this temperature for 15 minutes. The dyeing was then rinsed with cold water and dried at 80° C. in a through-circulation drying cabinet.

This dyeing was then padded on a pad-mangle with a liquor containing, per litre, 16 g of the condensation product described in Example 8 and 10 g of $MgCl_2$ at room temperature and a liquor pickup of 65%. The dyeing was then dried at 80° C. in a through-circulation drying cabinet and then fixed on a stenter frame at 180° C. for 1 minute.

| Fastness test | without aftertreatment | with aftertreatment |
|---|---|---|
| Wash fastness ISO C2 wash DIN 54 017 ISO 105-C06 | 0.9 | 4.3 |
| Light resistance DIN 54 004 | 5–6 | 5–6 |

USE EXAMPLE 23

A cotton fabric was treated at 40° C. in a winch machine with a dyeing liquor containing, per litre, a dyestuff mixture of 0.075 g of Direct orange 46+0.65 g of Direct red 89+0.275 g of Direct blue 85 at a liquor ratio of 20:1.

The dyeing bath was heated to 98° C. over a period of 30 minutes, and 20 g/l of calcined sodium sulphate were then added. After a dyeing time of one hour at the same temperature, the dyeing liquor was cooled to 80° C. at the rate of 1° C./minute and maintained at this temperature for 15 minutes. The dyeing was then rinsed with cold water and dried at 80° C. in a through-circulation drying cabinet.

This dyeing was then padded on a pad-mangle with a liquor containing, per litre, 32 g of the condensation product described in Example 8 and 10 g of $MgCl_2$ at room temperature and a liquor pickup of 65%.

The dyeing was then dried at 80° C. in a through-circulation drying cabinet and then fixed on a stenter frame at 180° C. for 1 minute.

| Fastness test | without aftertreatment | with aftertreatment |
|---|---|---|
| Wash fastness* ISO C2 wash DIN 54 017 ISO 105-C06 | 0.9 | 4.4 |
| Light* resistance DIN 54 004 | 3–4 | 5 |

*The ratings were taken from a scale of 1 (worst mark) to 5 (best mark) with respect to wash fastness and from a scale of 1 (worst mark) to 8 (best mark) with respect to the light resistance.

USE EXAMPLE 24

The polyester portion of a 45/55 cotton/polyester blend fabric was dyed with

- 0.099% of a yellow disperse dyestuff (Forongelb RD 4GRL®, Sandoz AG),
- 0.1% of a red disperse dyestuff (Foronrot RD®, Sandoz AG) and
- 0.13% of a blue disperse dyestuff (Foronblau RD GLF®, Sandoz AG)

and the cotton portion was dyed with

- 0.38% of a yellow direct dyestuff (Indosolgelb SF2RL®, Sandoz AG)
- 0.043% of a red direct dyestuff (Indosolrubinol SF RGRN®, Sandoz AG) and
- 0.069% of a blue direct dyestuff (Indosolmarineblau SF BL 250%®, Sandoz AG).

Dyeing was carried out in a roller bath using a dyeing liquor containing, in addition to the abovementioned dyestuffs, 1 g of a commercially available dispersing agent and 1 g of a commercially available softener and 10 g of sodium sulphate per litre at a liquor ratio of 10:1.

The dyeing bath was heated to 130° C. at a rate of 2° C./minute and maintained at this temperature for 30 minutes. The liquor was then cooled to 80° C. at a rate of 1° C. to 2° C./minute and maintained at this temperature for 20 minutes.

The dyeing was then rinsed with cold water until the rinsings were clear and then dried in a through-circulation drying cabinet.

The dyeing was then padded on a pad-mangle with a liquor containing, per litre, 20 g of the condensation product described in Example 8 and 10 g of $MgCl_2$ at room temperature and a liquor pickup of 60%.

The dyeing was then dried at 80° C. in a through-circulation drying cabinet and then fixed on a stenter frame at 180° C. for 1 minute.

The fastness tests of the dyeing aftertreated in this manner are listed in the table below.

| | Fastness properties (bleeding on cotton) | |
|---|---|---|
| | without aftertreatment | with aftertreatment |
| Water fastness DIN 54 006 | 2 | 4–5 |
| Alkaline perspiration fastness DIN 54 020 | 2–3 | 5 |
| Wash fastness 40° C. DIN 54 014 | 3 | 4–5 |
| Wash fastness 60° C. DIN 54 014 | 1–2 | 4–5 |
| Light resistance DIN 54 004 | PES: 4–5 CO: 3–4 | PES: 4–5 CO: 3–4 |

USE EXAMPLE 25

A cotton fabric was treated at 40° C. in a winch machine with a dyeing liquor containing, per litre, a dyestuff mixture of 0.075 g of Direct orange 46+0.65 g of Direct red 89+0.275 g of Direct blue 85 at a liquor ratio of 20:1.

The dyeing bath was heated to 98° C. over a period of 30 minutes, and 20 g/l of calcined sodium sulphate were then added. After a dyeing time of 1 hour at the same temperature, the dyeing liquor was cooled to 80° C. at the rate of 1° C./minute and maintained at this temperature for 15 minutes.

This dyeing was then rinsed with cold water and then dried at 80° C. in a through-circulation drying cabinet.

This dyeing was then padded on a pad-mangle with a liquor containing, per litre, 64 g of the condensation product described in Example 8 and 10 g of MgCl$_2$, 60 g of a 40% strength aqueous solution of dimethylol-dihydroxy-ethyleneurea and 30 g of a commercially available softener at room temperature and a liquor pickup of 65%.

The dyeing was then dried at 80° C. in a through-circulation drying cabinet and then fixed on a stenter frame at 180° C. for 1 minute.

| Fastness test | without aftertreatment | with aftertreatment |
|---|---|---|
| Wash fastness ISO C2 wash DIN 54 017 ISO 105-C06 | 0.9 | 4.3 |
| Light resistance DIN 54 004 | 3–4 | 5 |

USE EXAMPLE 26

A cotton fabric was treated on a pad-mangle with a liquor containing, per litre, 64 g of the condensation product described in Example 8 and 10 g of MgCl$_2$ at room temperature and a liquor pickup of 100%.

The fabric was then dried at 80° C. in a through-circulation drying cabinet and then fixed on a stenter frame at 180° C. for 1 minute.

The cotton fabric thus pretreated was then treated at 50° C. in a winch machine with a dyeing liquor containing, per litre, a dyestuff mixture of 0.5 g of Reactive brown 19+0.5 g of Reactive orange 64+0.5 g of Reactive blue 75 and 0.5 g of NaHCO$_3$ at a liquor ratio of 20:1.

After 40 minutes of treatment at this temperature, 4 g/l of Na$_2$CO$_3$ and, after another 30 minutes, 1.5 ml/l of sodium hydroxide solution 38° Bé were added. 60 minutes after the addition of sodium hydroxide solution, the dyeing at a constant temperature of 50° C. was rinsed at a liquor ratio of 20:1 as follows:

1×10 minutes at room temperature,
1×20 minutes at 98° C.,
1×10 minutes at room temperature.

This dyeing was then dried at 80° C. in a through-circulation drying cabinet.

An advantage of this method is that, compared with dyeing a non-pretreated cotton fabric with the same amount of dyestuff, 50 g/l of Na$_2$SO$_4$ are saved.

Furthermore, cross-dyeing a cotton fabric which has been pretreated as described gives a dyeing whose colour depth is approximately 80% higher than that obtained by the conventional method.

Moreover, when a cotton fabric which has been pretreated as described is cross-dyed, the dyeing liquor is almost completely exhausted and the dyestuffs do not migrate back to the rinsing liquor even when a 98° C. rinsing bath is used.

COMPARATIVE EXAMPLE 1

A dyeing obtained as in Use Example 1 with 1.95% of Direct red 212 on a cotton fabric was impregnated on a pad-mangle with a liquor containing, per litre, 30 g of the condensation product described in Example 8 and 10 g of MgCl$_2$ and squeezed off to a liquor pickup of 100%.

The dyeing was then dried at 80° C. in a through-circulation drying cabinet and then fixed on a stenter frame at 180° for 1 minute.

The fastness ratings of this dyeing A are listed in Table 3.

For comparison, a material dyed in the same manner was padded with a liquor containing, per litre, 50 g of the hydrogen sulphate salt of the condensation product obtained from diethylenetriamine and dicyandiamide (Example 4 of German Patent Specification 855 001) instead of the above-mentioned condensation product as the fastness-improving agent.

The fastness ratings of this dyeing B obtained after drying and fixation are also listed in Table 3.

COMPARATIVE EXAMPLE 2

A dyeing obtained as in Use Example 1 with 1.5% of Direct black 22 on a cotton fabric was impregnated, as described in Comparative Example 1, with a liquor containing, per litre, 30 g of the condensation product described in Example 8 and 10 g of MgCl$_2$, and was treated further as described above.

The fastness rating results of this dyeing C are listed in Table 3.

For comparison, a material dyed in the same manner was aftertreated, as described in Comparative Example 1, with a liquor containing, per litre, 50 g of the hydrogen sulphate salt of the condensation product mentioned in Comparative Example 1. The fastness rating results of this dyeing D are listed in Table 3.

TABLE 3

| | Dyeing A | Dyeing B | Dyeing C | Dyeing D |
|---|---|---|---|---|
| Water fastness DIN 54 006 | 5.0 | 1.6 | 5.0 | 3.1 |
| Perspiration fastness pH 8 DIN 54 020 | 4.9 | 1.6 | 4.9 | 2.6 |

TABLE 3-continued

| | Dyeing A | Dyeing B | Dyeing C | Dyeing D |
|---|---|---|---|---|
| Water fastness 40° DIN 54 017 ISO A2 wash | 4.8 | 2.8 | 4.8 | 4.3 |
| Wash fastness 60° DIN 54 017 ISO C2 wash | 4.3 | 2.1 | 4.4 | 2.4 |

What is claimed is:

1. N-methylol derivatives of polycondensation products containing quaternary N atoms obtained from A) basic ureas of the formula $$HN(R^1)-CO-N(R^2)-X^1-N(R^3, R^4) \quad (II),$$

in which $X^1$ denotes $C_2$–$C_4$-alkylene, $R^1$ and $R^2$, independently of one another, represent hydrogen or $C_1$–$C_4$-alkyl or $R^1$ and $R^2$ together denote 1,2-ethylene or trimethylene and $R^3$ and $R^4$ independently of one another represent hydrogen, $C_1$–$C_4$-alkyl or $C_2$–$C_4$-hydroxyalkyl, and $R^3$ can furthermore denote the radical $-X^1-N(R^2)-CO-NHR^1$ and $R^3$ and $R^4$ together can denote one of the radicals $-CH_2CH_2-O-CH_2CH_2-$ or $-CH_2CH_2-N(R^5)-CH_2CH_2-$ where $R^5$ denotes hydrogen, $C_1$–$C_4$-alkyl, $C_2$–$C_4$-hydroxyalkyl, the radical $-X^1-N(R^2)-CO-NHR^1$ or the radical $-CO-NH_2$, B) polyamines of the formula $$(R^6, R^7)N-X^2-N(R^8, R^9) \quad (II),$$

in which $X^2$ denotes $C_2$–$C_6$-alkylene which may be interrupted by $-O-$, $-NR^{10}-$ where $R^{10}$ represents hydrogen or $C_1$–$C_4$-alkyl or by $-NH-CO-NH-$, and $R^6$, $R^7$, $R^8$ and $R^9$, independently of one another, represent hydrogen, $C_1$–$C_4$-alkyl or $C_2$–$C_4$-aminoalkyl and $R^6$ and $R^7$ together and, independently thereof, $R^8$ and $R^9$ together or $R^6$ and $R^8$ together and, independently thereof, $R^7$ and $R^9$ together can denote 1,2-ethylene or trimethylene, and C) bifunctional alkylating agents wherein said agents are dihalogenoalkanes, dihalogenoalkenes, dihalogenoalkyl ethers, dihalogenoalkanols, epihalogenohydrins bis-epoxy compounds, α,ω-dihalogenoalkenes and epihalogenohydrins.

2. The N-methylol derivatives of polycondensation products of claim 1, in which the basic ureas used are those of the formula $$H_2N-CO-NH-X^1-N(R^{13}, R^{14}) \quad (III)$$

in which $X^1$ denotes $C_2$–$C_4$-alkylene and $R^{13}$ and $R^{14}$, independently of one another, denote $C_1$–$C_3$-alkyl and $R^{13}$ furthermore can denote $-X^1-NH-CO-NH^2$.

3. The N-methylol derivatives of polycondensation products of claim 1, in which the polyamines used are those of the formula $$(R^{16}, R^{17})N-X^2-N(R^{18},R^{19}) \quad (IV)$$

in which $X^2$ denotes $C_2$–$C_6$-alkylene which may be interrupted by $-O-$, $-NR^{10}-$ where $R^{10}$ represents hydrogen or $C_1$–$C_4$-alkyl or by $-NH-CO-NH-$, and $R^{16}$, $R^{17}$, $R^{18}$ and $R^{19}$ independently of one another denote hydrogen or $C_1$–$C_3$-alkyl.

4. A process for preparing the N-methylol derivatives of polycondensation products of claim 1, wherein A) basic ureas, B) polyamines and C) bifunctional alkylating agents as defined in claim 1 are reacted in an A/B/C molar ratio of 0.5–2.5:1:1.0–3.2 at 40° to 130° C. in the presence of water of polar organic solvents as the reaction medium, and the reaction products are then reacted with formaldehyde or formaldehyde-releasing compounds at 40° to 110° C. and a pH value of 8 to 11, with 0.5–1.2 mol of formaldehyde being used per urea group $-M(R^2)-CO-NH(R^1)$.

5. The process of claim 4, wherein an A/B/C molar ratio of 1.5–2.3:1:2.0–3.0 is employed.

6. The process of claim 4, wherein the reaction medium is present in an amount of 50–500% by weight, relative to the total weight of A, B and C.

7. The process of claim 6, wherein the reaction medium is present in an amount of 50–200% by weight, relative to the total weight of A, B and C.

8. The process of claim 4, wherein 0.8–1.0 mol of formaldehyde are used per urea group.

9. The N-methylol derivatives of polycondensation products according to claim 1 wherein the bifunctional alkylating agent is selected from the group consisting of 1,2-dichloroethane, 1,2-dichloropropane, 1,3-dichloropropane, 1-bromo-3-chloropropane, 1,4-dichlorobutane, 1,6-dichlorohexane, 1,4-dichloro-2-butene, bis-(2-chloroethyl)ether, 1,3-dichloro-2-propanol, epibromohydrin, epichlorohydrin, diglycidyl ether, ethane-1,2-bis-glycidyl ether and butane-1,4-bis-glycidyl ether.

* * * * *

UNITED STATES PATENT AND TRADEMARK OFFICE
CERTIFICATE OF CORRECTION

PATENT NO. : 5,569,724
DATED : October 29, 1996
INVENTOR(S) : Hendricks, et al.

It is certified that error appears in the above-indentified patent and that said Letters Patent is hereby corrected as shown below:

Title Page & Col 1 line 1    Title [54] Delete " N-MENTHYLOL " and substitute -- N-METHYLOL --

Title Page    ABSTRACT: Line 4 after " -C " insert -- O --

Signed and Sealed this

Eleventh Day of March, 1997

*Attest:*

BRUCE LEHMAN

*Attesting Officer*   Commissioner of Patents and Trademarks